United States Patent [19]
Kinney et al.

[11] Patent Number: 5,775,819
[45] Date of Patent: Jul. 7, 1998

[54] ROLLER BEARING ASSEMBLY AND METHOD FOR MAKING THE SAME

[75] Inventors: Layton R. Kinney, Rocky Hill; John A. Hitchiner, Burlington, both of Conn.

[73] Assignee: Virginia Industries, Inc., Rocky Hill, Conn.

[21] Appl. No.: 616,105

[22] Filed: Mar. 14, 1996

[51] Int. Cl.$^6$ ............................................. F16C 33/60
[52] U.S. Cl. .................... 384/544; 384/449; 384/499; 384/504; 384/506
[58] Field of Search .................... 384/449, 499, 384/501, 502, 504, 505, 506, 510, 512, 513, 515, 537, 543, 544, 545, 546, 547

[56] References Cited

U.S. PATENT DOCUMENTS

| | | | |
|---|---|---|---|
| 774,427 | 11/1904 | Hoffman | 384/504 |
| 1,303,235 | 5/1919 | Benson | 384/544 |
| 1,330,579 | 2/1920 | Bryant et al. | 384/515 |
| 1,379,945 | 5/1921 | Teetsow | 384/504 |
| 1,489,013 | 4/1924 | Schatz | 384/506 |
| 2,037,982 | 4/1936 | Hughes | 384/506 |
| 2,075,280 | 3/1937 | Green | 384/504 |
| 2,643,917 | 6/1953 | Douglas et al. | 384/544 X |
| 2,728,617 | 12/1955 | Edwards | 384/512 |
| 2,783,528 | 3/1957 | Menne | 29/898.063 |
| 3,036,365 | 5/1962 | Hanau | 29/898.063 |
| 3,579,782 | 5/1971 | Hallerback | 29/898.066 |
| 3,583,511 | 6/1971 | Asberg | 384/554 X |
| 3,657,781 | 4/1972 | Camosso | 29/898.066 |
| 3,986,754 | 10/1976 | Torrant | 384/504 |
| 4,073,551 | 2/1978 | Sutowski | 384/501 |
| 4,081,204 | 3/1978 | Bauer et al. | 384/569 |
| 4,569,602 | 2/1986 | Lundgren | 384/499 |

(List continued on next page.)

FOREIGN PATENT DOCUMENTS

| | | |
|---|---|---|
| 0 141 040 | 5/1985 | European Pat. Off. . |
| 0 328 496 | 8/1989 | European Pat. Off. . |
| 2 308 826 | 12/1976 | France . |
| 924 924 | 3/1955 | Germany . |
| 1034485 | 7/1958 | Germany ................ 384/449 |
| 2 209 454 | 9/1973 | Germany . |
| 3821051 A1 | 12/1989 | Germany . |
| 3822961 A1 | 1/1990 | Germany . |
| 602497 | 3/1960 | Italy ................ 384/449 |
| 63-152713 | 6/1988 | Japan . |
| 27918 | of 1913 | United Kingdom ........... 384/501 |
| 621857 | 4/1949 | United Kingdom ........... 384/449 |

*Primary Examiner*—Thomas R. Hannon
*Attorney, Agent, or Firm*—St. Onge Steward Johnston & Reens, LLC

[57] ABSTRACT

A roller bearing assembly is disclosed which has a single-piece outer race ring having a central, circumferential depression and a pair of raceway surfaces on opposite sides thereof. An inner race ring, sized and shaped to fit within the outer race ring, comprises a pair of inner race members. Each of the inner race members has two ends and a raceway surface formed at least in part by a shoulder. The inner race members are positioned so as to abut each other at their respective abutting ends and are axially aligned such that the raceway surfaces of the inner race members are aligned with one of the raceway surfaces of the outer race ring to form two raceways. A substantially tubularly-shaped inner sleeve having two ends is disposed in the internal bore of the inner race ring for maintaining the axial alignment of the inner race members. The inner sleeve has stop members, in the form of flared ends, which cooperate with the shoulders of each of the inner race members to desirably position the inner sleeve inside the inner race ring. Additionally, each inner race member has an axially and circumferentially extending lip which extends beyond the ends of the inner sleeve for connecting the roller bearing assembly to a desirable device. Advantageously, the roller bearing device comprises only four pieces: the inner race ring, the two inner race members and the inner sleeve. Thus, the device is simple to manufacture and assemble.

7 Claims, 2 Drawing Sheets

U.S. PATENT DOCUMENTS

| | | | |
|---|---|---|---|
| 4,571,099 | 2/1986 | Balken et al. | 384/501 X |
| 4,620,342 | 11/1986 | Haussels | 384/504 X |
| 4,925,322 | 5/1990 | Hishida | 384/486 |
| 5,028,150 | 7/1991 | Kronenberger et al. | 384/476 |
| 5,177,869 | 1/1993 | Andersson | 29/898.062 |
| 5,190,301 | 3/1993 | Malewicz | 280/11.22 |
| 5,193,916 | 3/1993 | Andersson | 384/512 |
| 5,271,633 | 12/1993 | Hill, Jr. | 384/510 X |
| 5,325,586 | 7/1994 | Andersson | 29/898.062 |
| 5,518,322 | 5/1996 | Hicks | 384/544 |

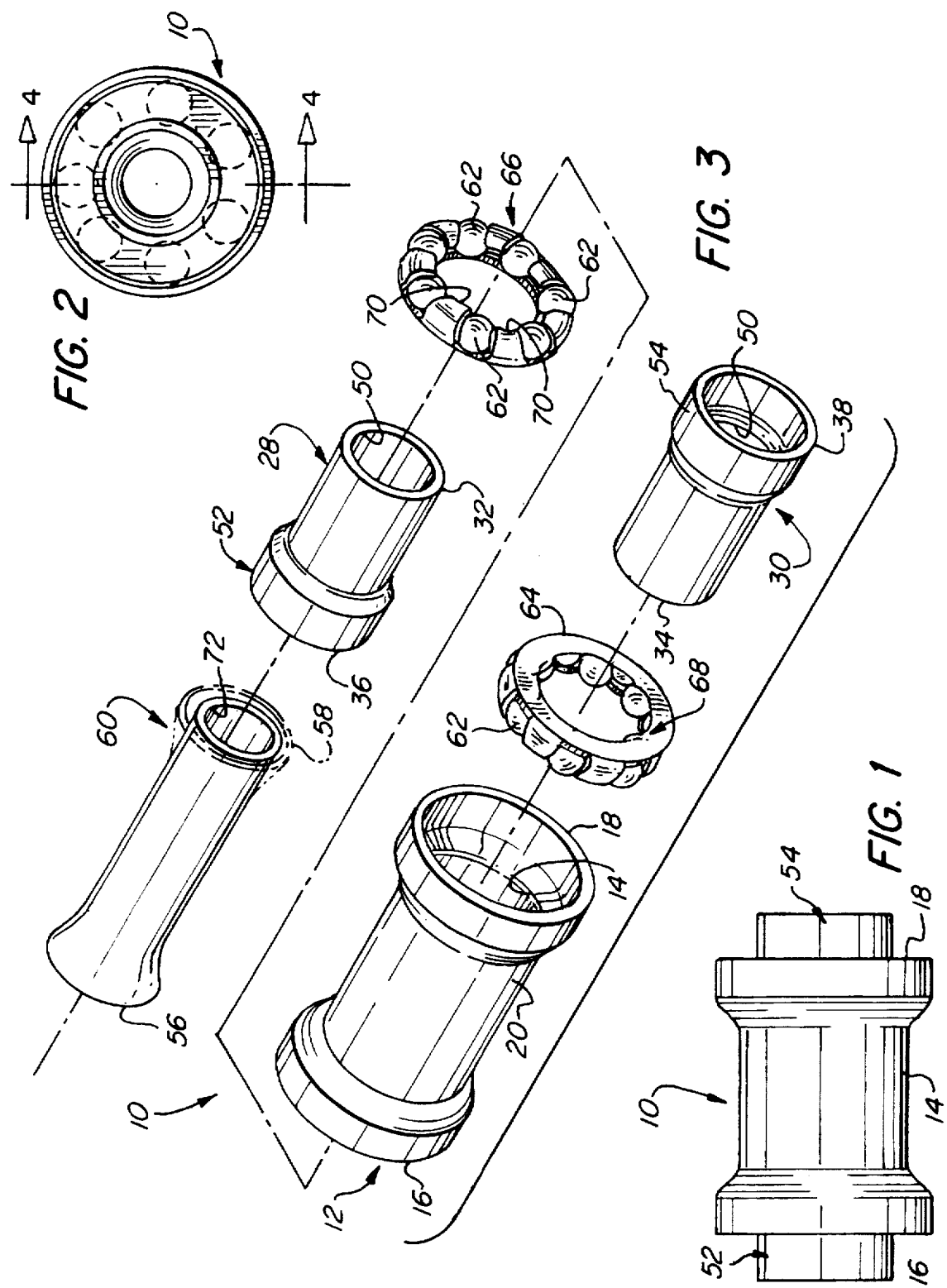

5,775,819

1

ROLLER BEARING ASSEMBLY AND METHOD FOR MAKING THE SAME

FIELD OF THE INVENTION

The present invention relates to roller bearings, and more particularly to roller bearing assemblies and a method for making the same, for use with rotating shafts and the like.

BACKGROUND OF THE INVENTION

Roller bearing assemblies comprising inner and outer race rings which have two raceways are known. Generally, one of the race rings is sectioned to facilitate assembly of the device. When the inner race ring is sectioned, a retaining member maintains the position of the raceway and its corresponding raceway surface relative to the roller bearing balls disposed therein.

For example, U.S. Pat. No. 1,379,945 to Teetsow discloses a ball bearing assembly comprising an outer race (6) and an inner race (7). The inner race (7) is comprised of two sections which are retained by a radially extending locking member (10). To assemble the device, the two raceways (7) are positioned adjacent to each other; then the channeled locking ring 10 is snapped into position by pressing its ends inwardly until the ring passes into an internal bore of the inner race and expansively engages the groove of the race to lock the sections (7) together.

U.S. Pat. No. 2,037,982 to Hughes discloses a bearing mounting comprising a one-piece outer race ring and a pair of inner race rings (20), which abut each other. A sleeve or hub (72) is mounted in the inner race rings (20) and is clamped by nuts (76) to a brake drum (78).

U.S. Pat. No. 2,075,280 to Green discloses a pair of inner race rings (14) and a one-piece outer race (2). The inner races (14) are maintained in position by a split snap ring (26).

U.S. Pat. No. 2,643,917 to Douglas et al. discloses a wheel comprising inner and outer bearing races (14, 15) with bearings (16) disposed therebetween. A tubular axle sleeve 17 serves as an inner race retainer and spacer and it has spaced circumferential ridges (32) which axially space the inner bearing races; its ends (33) are flared outwardly against the cylindrical and outer end surfaces of the inner races to retain them in spaced relation against ridges (32).

U.S. Pat. No. 3,986,754 to Torrant discloses a bearing assembly comprising a pair of inner race members (22, 24); a soft, metal ring (20) is positioned between the facing ends of the races (22, 24). An axial compressive force (F) is then applied to the annular ring (20) through the hardened races (22, 24) to permanently deform the ring (20) and reduce its dimensional width in the axial direction.

Chinese patent document No. 63-152713 discloses a double row ball bearing (26) comprising an outer ring (42), two inner rings (30, 40), a plurality of balls (44), and a connecting ring (46) which bestrides the two inner rings (30, 40) so as to inseparably connect the connecting ring with the inner rings (30, 40).

Germany patent document DE 3821-051-A discloses an outer race ring (5) which has a protruding lip; however, the device is complicated to manufacture and assemble because inner race ring comprises three separate components.

Each of the aforementioned devices, in addition to having the disadvantages set out above, are undesirable because they have a large number of fitting parts, each of which must be accurately sized, shaped, manufactured and assembled in accordance with strict engineering requirements to provide suitable performance. Understandably, this is a time consuming task.

2

Further, each of the devices are undesirable because they are connected to a rotating shaft or the like generally via a shaft inserted into the internal bore of the inner race member. It is desirable to have an additional connecting means.

What is desired, therefore, is a roller bearing assembly which has fewer parts than those devices of the prior art, which can be quickly and easily manufactured and assembled, which can be hardened prior to assembly, and which has an additional connecting means. Further, it is desirable to provide a bearing having tight tolerances so that the bearing runs smoothly and freely.

SUMMARY OF THE INVENTION

Accordingly, it is an object of the present invention to provide a roller bearing assembly which has fewer parts than those devices of the prior art.

It is another object of the present invention to provide a roller bearing assembly which can be quickly and easily manufactured and assembled.

It is still a further object of the present invention to provide a roller bearing assembly which can manufactured via a process which allows the inner and outer races to be hardened prior to assembly.

It is yet a further object of the present invention to provide a roller bearing assembly which comprises means for connecting the inner race ring to another object.

To overcome the deficiencies of the prior art and to achieve the objects and advantages listed above, a roller bearing assembly is disclosed which comprises an outer race ring. An inner race ring comprising a pair of inner race ring members is disposed inside the outer race ring. When the inner race ring is properly positioned with respect to the outer race ring, two raceways are formed therebetween. When the two inner race ring members are joined, a central bore is formed which extends between their ends. An inner sleeve extends through the central bore of the inner race ring and maintains the position of the inner race ring members.

More particularly, the outer race ring comprises a single-piece, substantially tubularly-shaped member having a central, circumferential depression and a pair of raceway surfaces on opposite sides of the depression.

The inner race ring comprises a pair of inner race members, each of which has an abutting end and a free end and a raceway surface formed at least in part by a shoulder located at substantially the free end. The inner race members are positioned so as to abut each other at their respective abutting ends and are axially aligned so as to have a substantially continuous internal bore extending substantially between the free ends. When properly aligned, each of the raceway surfaces of the inner race members are aligned with one of the raceway surfaces of the outer race ring to form two cylindrical raceways.

Additionally, each inner race member has an axially and circumferentially protruding lip extending from the shoulder. The lip of each of the inner race members extends beyond the ends of the inner sleeve and provides a simple and effective way to connect the roller bearing assembly to another device.

The inner sleeve is substantially tubularly-shaped and is sized and shaped to fit snugly in the internal bore of the inner race ring. Advantageously, each end of the inner sleeves is flared outwardly to cooperate with the shoulders of each of the inner race members to desirably position the inner sleeve inside the inner race ring.

Advantageously, these parts are the only parts (other than the roller bearings) which must be manufactured and assembled. Because there are so few parts, and they each fit neatly and easily within each other, the device may be assembled very quickly. Further, due to the low number of parts, manufacturing costs may be kept to a minimal.

The invention and its particular features and advantages will become more apparent from the following detailed description when considered with reference to the accompanying drawings.

BRIEF DESCRIPTION OF THE DRAWINGS

FIG. 1 is a side view of a roller bearing assembly, constructed in accordance with the present invention;

FIG. 2 is an end view of the roller bearing assembly shown in FIG. 1;

FIG. 3 is an isometric, exploded view of the roller bearing assembly shown in FIG. 1;

DETAILED DESCRIPTION OF THE DRAWINGS

Figure 4:
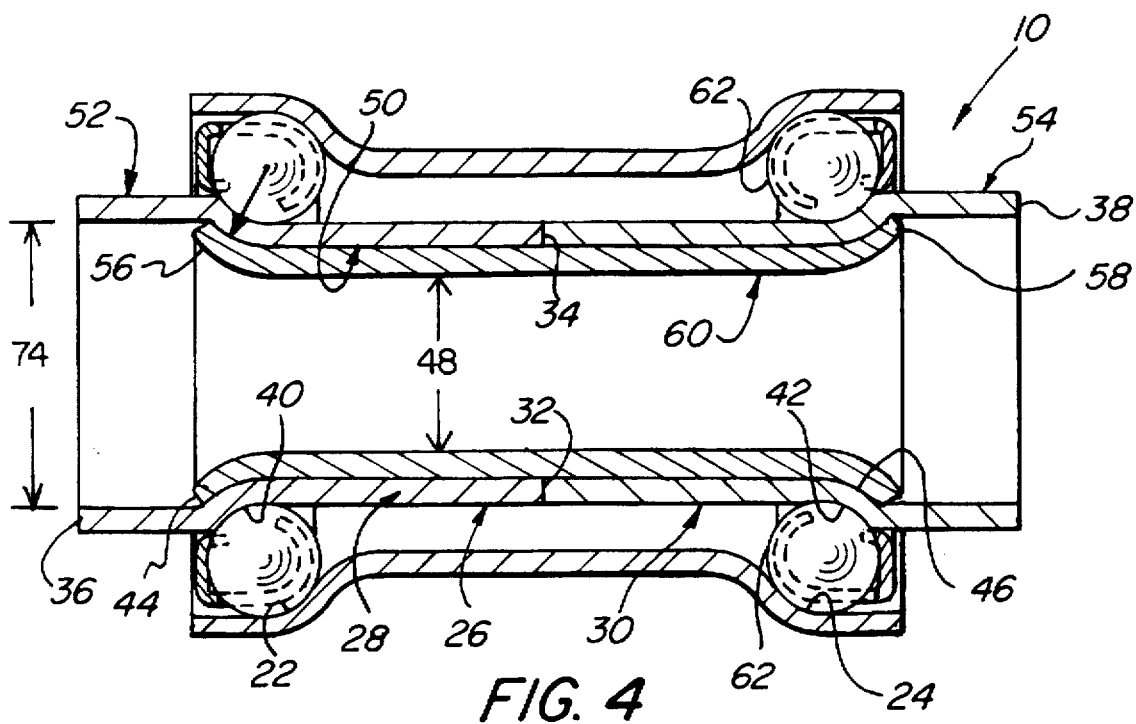
FIG. 4 is a cross sectional view of the roller bearing assembly, taken along line 4—4 of FIG. 2.

Referring to the drawings in detail, a roller bearing assembly is shown and generally designated by the reference numeral 10. It should be noted that for the sake of clarity all the components and parts of roller bearing assembly 10 may not be shown and/or marked in all the drawings.

Figure 5:
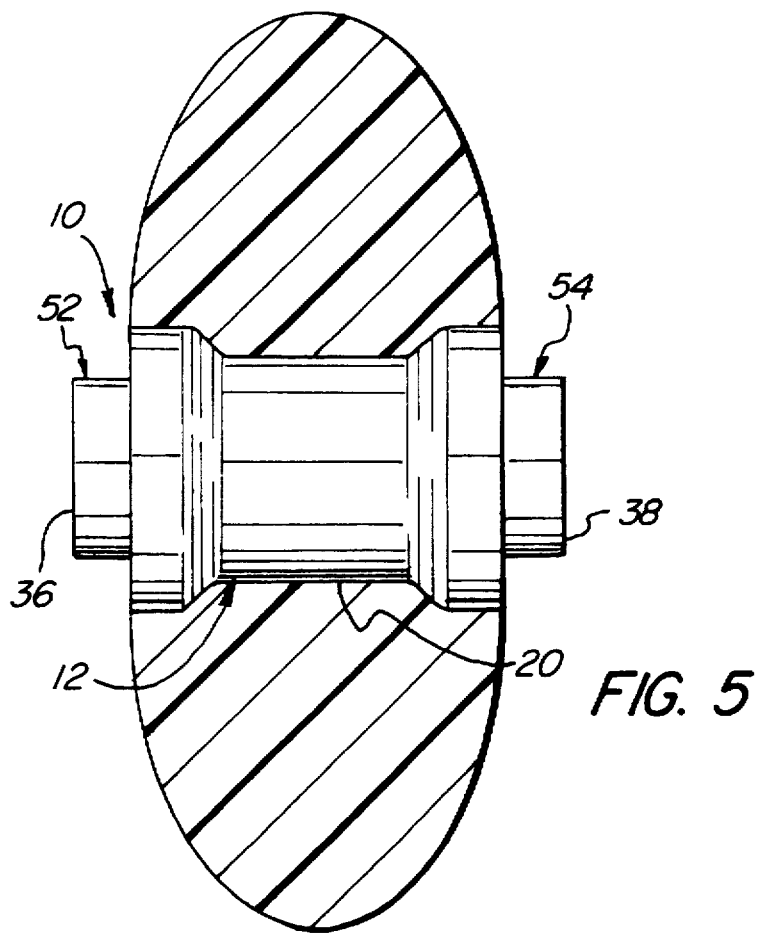
FIG. 5 is a side view of the roller bearing assembly shown in FIG. 1 operably mounted to a wheel, the wheel being shown in cross-section.

As shown in FIGS. 1, 3, 5 roller bearing assembly 10 comprises an outer race ring 12, which is preferably formed from a single-piece of substantially tubularly-shaped metal. A central bore 14 extends through outer race ring 12 between its ends 16, 18. As best shown in FIG. 4, outer race ring 12 has a central, circumferential depression 20 and a pair of raceway surfaces 22, 24 (FIG. 4) positioned on opposite sides of depression 20 and at substantially its ends 16, 18.

The ring 12 preferably has a uniform thickness and may be formed by machining, expansion of a tubular member, or by coining, or in any other manner known in the art of metal forming.

Referring in detail to FIGS. 3–4, inner race ring 26 is sized and shaped to fit inside bore 14 of outer race ring 12 and comprises a pair of inner race members 28, 30. Each of the inner race members 28, 30 has an abutting end 32, 34, a free end 36, 38 and a raceway surface 40, 42, respectively. Raceway surfaces 40, 42 are formed at least in part by a shoulder 44, 46 located at substantially the free end 36, 38. The shoulders 44 and 46 preferably have a cylindrical portion for supporting ball bearings.

Each of the inner race members 28, 30 has a minimum diameter 48 (only one of which is shown for the sake of convenience) between shoulder 44 and abutting end 32 and are positioned so as to abut each other at their respective abutting ends 32, 34. When properly axially aligned, a substantially continuous internal bore 50 extends substantially between free ends 36, 38. Additionally, raceway surfaces 40, 42 of inner race members 28, 30 are aligned with one of the raceway surfaces 22, 24 of outer race ring 12 to form two raceways.

Advantageously, each inner race member 28, 30 has an axially and circumferentially extending lip 52, 54 which protrudes from the corresponding shoulder 44, 46. Most preferably, the axially and circumferentially extending lip 52, 54 of each of the inner race members 28, 30 extends beyond the ends 56, 58 of inner sleeve 60. Lips 52, 54 are advantageous because they allow the roller bearing assembly 10 to be connected to a desired device quickly and easily. In one form of the invention, the bearing is designed to be used for inline skate wheels, and the lips 52 and 54 function as spacers that separate the wheel from the support brake of the skate.

The raceways, when properly formed by inner and outer race rings 12, 26, respectively, have a size and shape for receiving a plurality of rolling elements, such as roller bearing balls 62. As shown in FIG. 2, rolling balls, such as 62, are generally housed in a conventional jacket 64, which has a front 66 and back 68. Arcuate fingers, such as 70, extend from back 68 to front 66 and are arranged in an alternating fashion with balls 62. Fingers, such as 70, serve to retain balls 62 within jacket 64, yet allow free rotation therein. Any suitable jacket may be used, so long as balls 62 suitably freely rotate.

Inner sleeve 60 has two opposing ends 56, 58 and bore 72 extending therebetween. Sleeve 60 is sized and shaped to fit snugly within internal bore 50 of inner race ring 26 and maintains the position of the abutting inner race members 28, 30. Most preferably, inner sleeve 60 is formed from a single piece of metal and is substantially tubularly-shaped. When properly positioned in roller bearing assembly 10, internal bore 72 of inner sleeve 60 is substantially coaxially positioned within inner race ring 26 and has a diameter at its midpoint which is substantially equal to the diameter of a shaft 76 which is to be inserted therein.

Additionally, inner sleeve 60 comprises stop members which cooperate with shoulders 44, 46 of inner race members 28, 30, respectively, to desirably position inner sleeve 60 inside inner race ring 26. Most preferably, the stop members of inner sleeve 60 comprise two ends which are flared outwardly so that inner sleeve 60 has a diameter 74 at the position of the flared ends (only one flare end is shown in FIG. 3) that is greater than the minimum diameter 48 of each of the inner race members 28, 30. Although diameter 74 may be any suitable size, it is most preferably about 0.3 inches to about 0.7 inches.

As shown in FIG. 4, each of the shoulders 44, 46 of the inner race members 28, 30 have a maximum radius of curvature 75 which is substantially equal to the minimum radius of curvature 75 of the inner sleeve 60. Thus, as illustrated, shoulders 44, 46 of each of inner race members 28, 30 are flush with at least a portion of sleeve 60 at the position of its ends.

A method for assembling the roller bearing assembly 10 in accordance with the present invention generally comprises the following steps. First, one metal work piece is formed into an outer race ring 12 having two raceway surfaces 22, 24 thereon. Additionally, first and second inner race members 28, and 30 are formed, wherein each of the race members has a raceway surface 40, 42 thereon. The formed metal is then hardened in a conventional process so that the races which support the balls have a hard, smooth rigid surface on which the balls run.

One end, such as 56, of the inner sleeve 60 is flared outwardly so that it has a greater diameter than the remainder of the inner sleeve.

The roller bearing device 10 is assembled in the following manner after the inner race members and the outer race ring have been hardened. The first inner race member 28, for example, is positioned over the inner sleeve 60 so that the lip 52 extends beyond the flared end 56 of the inner sleeve 60. A plurality of rolling elements 62 in jacket 64 are positioned on the raceway surface 40 of the first inner race member 28 and positioned so that the front 66 of jacket 64 faces the center of sleeve 60. The outer race ring 12 is then positioned over the rolling elements 60 positioned on the raceway surface 40.

Then, a plurality of rolling elements 62 in jacket 64 are positioned on the other raceway surface 42 and arranged so that the front 66 of jacket 64 faces the center of sleeve 60. Afterwards, the second inner race member 30 is positioned so that its a butting end 34 abuts the abutting end 32 of the first inner race member 28. When properly positioned, the axially extending lip 54 of the second inner race member 30 extends beyond the end 58 of inner sleeve 60.

Next, the other end 58 of the inner sleeve 60 is flared outwardly (as shown in dashed lines in FIG. 2 and in solid lines in FIG. 4) so as to retain the second inner race member 30 in axial alignment with the first inner race member 28 and so that their respective raceway surfaces 40, 42 are in proper position relative to the rolling elements 62.

The bearing may be used to support a wheel, such as that shown in FIG. 5. The wheel is permanently molded onto the bearing.

It should be understood that roller bearing assembly 10 may take on any desirable size and shape, so long as the inner race ring members are properly positioned relative to each other and so long as the raceways are maintained in proper position relative to the roller bearing balls 62.

Most preferably, however, the sizes and tolerances are as follows outer race ring 12 has a length of about 1.2240 inches±0.0030 inches. Each of the inner race ring members 28, 30 has a length of about 0.8110 inches±0.0025 inches. Additionally, inner sleeve 60 has a length of about 1.2240 inches±0.0030 inches.

The present invention, therefore, provides a new and useful roller bearing assembly which has fewer moving parts than those devices of the prior art. Advantageously, there are only four parts which must be manufactured and assembled: the single unit outer race ring 12; the two inner race members 28, 30; and the single-piece inner sleeve 60. Further, because each of these members are coaxially positioned and fit snugly within each other, critical alignment procedures need not be implemented by the user.

Additionally, the present invention is advantageous because the members that are desired to be hardened (the two inner race members 28, 30 and the outer race member 12) may be hardened prior to assembly.

It should be understood that the foregoing is illustrative and not limiting and that obvious modifications may be made by those skilled in the art without departing from the spirit of the invention. Accordingly, reference should be made primarily to the accompanying claims, rather than the foregoing specification, to determine the scope of the invention.

What is claimed is:

1. A roller bearing assembly consisting essentially of:

a single-piece, substantially tubularly-shaped outer race ring having a central, circumferential depression and a pair of raceway surfaces on opposite sides of the depression;

an inner race ring sized and shaped to fit within the outer race ring and comprising a pair of inner race members, each inner race member having an axially and circumferentially extending lip extending from the shoulder, an abutting end, a free end and a raceway surface formed at least in part by a shoulder located at substantially the free end, the inner race members positioned so as to abut each other at their respective abutting ends and being axially aligned so as to have a substantially continuous internal bore extending substantially between the free ends and such that each of the raceway surfaces of the inner race members are aligned with one of the raceway surfaces of the outer race ring to form two raceways;

a plurality of rolling elements disposed in each raceway; and a substantially tubularly-shaped inner sleeve having two ends and sized and shaped to fit snugly in the internal bore of the inner race ring for maintaining the position of the inner race members, the inner sleeve having a plurality of stop members at each end which cooperate with the shoulders of each of the inner race members to desirably position the inner sleeve inside the inner race ring.

2. The roller bearing assembly of claim 1, wherein the axially and circumferentially extending lip of each of the inner race members extends beyond the ends of the inner sleeve.

3. The roller bearing assembly of claim 2, each inner race member having a minimum diameter measured between the shoulder and the abutting end, the stop members of the inner sleeve comprising at least one end flared outwardly so that the inner sleeve has a diameter at the position of the flared end that is greater than the minimum diameter of each of the inner race members.

4. The roller bearing assembly of claim 3, further comprising a shaft extending through the internal bore of the inner sleeve.

5. A roller bearing assembly comprising:

a substantially tubularly-shaped outer race ring having two opposing ends and a circumferential depression therebetween, and a pair of raceway surfaces on opposite sides of the circumferential depression;

an inner race ring sized and shaped to fit within the outer race ring and comprising a pair of inner race members, each of the inner race members having an abutting end, a free end, a raceway surface formed at least in part by a shoulder located at substantially the free end, and an axially and circumferentially extending lip extending from the shoulder, each of the inner race members having a minimum diameter between the shoulder and the abutting end, the inner race members positioned so as to abut each other at their respective abutting ends and being axially aligned so as to have a substantially continuous internal bore extending substantially between the free ends and such that each of the raceway surfaces of the inner race members are aligned with one of the raceway surfaces of the outer race ring to form two raceways;

a plurality of roller bearing balls disposed in each of the raceways; and an inner sleeve disposed in the bore of the inner race ring and having two ends, the ends of the inner sleeve being flared outwardly such that the inner sleeve has a maximum outer diameter at the position of the flared ends that is greater than the minimum diameter of the inner race members, wherein the axially and circumferentially extending lips of the inner race members extend beyond the ends of the inner sleeve.

6. The roller bearing assembly of claim 5, each of the shoulders of the inner race members having a maximum radius of curvature, the inner sleeve having a minimum radius of curvature, the maximum radius of curvature of each of the shoulders of the inner race members being substantially equal to the minimum radius of curvature of the inner sleeve.

7. The roller bearing assembly of claim 6, the inner sleeve having an axially-extending, internal bore therethrough, the roller bearing assembly further comprising a shaft positioned in the axially-extending, internal bore.

* * * * *